United States Patent
Nedachi et al.

(10) Patent No.: US 8,657,091 B2
(45) Date of Patent: Feb. 25, 2014

(54) CLUTCH DEVICE

(75) Inventors: Yoshiaki Nedachi, Wako (JP); Yoshiaki Tsukada, Wako (JP); Takashi Ozeki, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 317 days.

(21) Appl. No.: 13/154,044

(22) Filed: Jun. 6, 2011

(65) Prior Publication Data

US 2011/0297504 A1 Dec. 8, 2011

(30) Foreign Application Priority Data

Jun. 8, 2010 (JP) ................................ 2010-130729

(51) Int. Cl.
*F16D 21/06* (2006.01)
*F16D 28/00* (2006.01)

(52) U.S. Cl.
USPC .......... 192/48.2; 192/48.8; 192/90; 192/30 W

(58) Field of Classification Search
USPC ........................................ 192/48.2, 84.6, 90
See application file for complete search history.

(56) References Cited

U.S. PATENT DOCUMENTS

| | | | | |
|---|---|---|---|---|
| 5,421,440 | A | * | 6/1995 | Kumagai ........................ 192/90 |
| 7,726,456 | B2 | * | 6/2010 | Ha .................................. 192/90 |
| 2007/0144857 | A1 | * | 6/2007 | Tsukada et al. ............... 192/48.8 |
| 2010/0187067 | A1 | * | 7/2010 | Hasenkamp et al. ......... 192/93 B |

FOREIGN PATENT DOCUMENTS

JP 2007-177907 A 7/2007

* cited by examiner

*Primary Examiner* — Richard M. Lorence
(74) *Attorney, Agent, or Firm* — Westerman, Hattori, Daniels & Adrian, LLP

(57) ABSTRACT

A clutch device which transmits torque by causing multiple friction engagement elements to engage with each other by use of a clutch connection/disconnection member caused to operate by an electric actuator includes: an elastic member disposed between the clutch connection/disconnection member and the multiple friction engagement elements; position detector for detecting a position of the clutch connection/disconnection member; and controller for controlling an operation of the electric actuator on the basis of the position of the clutch connection/disconnection member detected by the position detector. Thus, the position of the clutch connection/disconnection member (i.e. a stroke amount of the elastic member) and a torque transmission capacity of the clutch device have a linear relationship with each other. Hence, the torque transmission capacity of the clutch device can be accurately controlled by the electric actuator.

16 Claims, 10 Drawing Sheets

CLUTCH DEVICE

TECHNICAL FIELD

The present invention relates to a clutch device which transmits torque by causing multiple friction engagement elements to engage with each other by use of a clutch connection/disconnection member caused to operate by an electric actuator.

BACKGROUND OF THE INVENTION

A twin-clutch automatic transmission as described below is publicly known by Japanese Patent Application Publication No. 2007-177907. A first clutch and a second clutch are respectively provided to an inner main shaft and an outer main shaft disposed coaxially in the twin-clutch automatic transmission. Engagement and disengagement of the first and second clutches are performed by actuators each formed of an electric motor.

SUMMARY OF THE INVENTION

FIG. 7 is a block diagram of a control system in which an engagement capacity of a clutch is controlled through a feedback control by using a hydraulic actuator 03 such as a hydraulic cylinder. A linear solenoid 02 controls a hydraulic pressure to be supplied to the hydraulic actuator 03 on the basis of an instruction current value from an electronic control unit 01. Then, the hydraulic actuator 03 moves to a predetermined position and a pressing member 04 presses friction engagement elements of a clutch 05. This clutch pressure contact force causes the clutch 05 to be engaged by a predetermined clutch capacity. At this time, the instruction current value, the hydraulic pressure, the position, the clutch pressure contact force, and the clutch capacity have a linear relationship with each other. Thus, the clutch capacity can be accurately controlled by providing, to the electronic control unit 01, a feedback of the hydraulic pressure outputted by the linear solenoid 02.

FIG. 8 is a block diagram of a control system in which a feedback control of an engagement capacity of a clutch 09 is performed by using an electric actuator 07 such as an electric motor, as in JP 2007-177907. When the value of a current to be supplied to the electric actuator 07 is controlled based on the instruction current value from an electronic control unit 06, the electric actuator 07 moves to a predetermined position and a pressing member 08 presses friction engagement elements of the clutch 09. This clutch pressure contact force causes the clutch 09 to be engaged by a predetermined clutch capacity. At this time, the clutch pressure contact force is in a linear relationship with the clutch capacity. However, the position (moving amount) of the electric actuator 07 is not in a linear relationship with the clutch capacity. Thus, even when the position of the electric actuator 07 is fed back to the electronic control unit 06, it may be difficult to accurately control the clutch capacity in some cases.

FIG. 9(A) is a schematic view of a normally-closed clutch (clutch which is disengaged when an actuator operates), and a first friction engagement element 011 and a second friction engagement element 012 engageably face each other. The clutch is in engagement when the first friction engagement element 011 is biased by an engagement spring 013 in a direction to be engaged with the second friction engagement element 012. In this state, when a pressing member 014 caused to operate by an electric actuator presses the first friction engagement element 011 while compressing the engagement spring 013, the first friction engagement element 011 is moved away from the second friction engagement element 012 and the clutch is disengaged.

FIG. 9(B) is a graph showing a relationship between the stroke of the pressing member 014 and the clutch pressure contact force in the normally-closed clutch described above. The clutch pressure contact force is maintained at a constant value determined by the elastic force of the engagement spring 013, until the stroke of the pressing member 014 reaches L (clutch touch point) from zero. In the instant the stroke of the pressing member 014 reaches L, the clutch pressure contact force drops abruptly to zero, and the clutch is disengaged. Accordingly, even if the clutch capacity is controlled by changing the position of the pressing member 014 by the electric actuator, there are cases where a highly accurate control thereof is difficult to perform since the clutch pressure contact force abruptly changes.

FIG. 10(A) is a schematic view of a normally-open clutch (clutch which is engaged when an actuator operates), and a first friction engagement element 011 and a second friction engagement element 012 engageably face each other. The clutch is in disengagement when a pressing member 014 to press the second friction engagement element 012 in a direction to be engaged with the first friction engagement element 011 is biased by a disengagement spring 015 in a disengagement direction. In this state, when the pressing member 014 caused to operate by an electric actuator presses the second friction engagement element 012 while compressing the disengagement spring 015, the second friction engagement element 012 comes into contact with the first friction engagement element 011 and the clutch is engaged.

FIG. 10(B) is a graph showing a relationship between the stroke of the pressing member 014 and the clutch pressure contact force in the normally-open clutch described above. The clutch pressure contact force is maintained at zero until the stroke of the pressing member 014 reaches L (clutch touch point) from zero. In the instant the stroke of the pressing member 014 reaches L, the clutch pressure contact force rises abruptly, and the clutch is engaged. Accordingly, even if the clutch capacity is controlled by changing the position of the pressing member 014 by the electric actuator, there are cases where a highly accurate control thereof is difficult to perform since the clutch pressure contact force abruptly changes.

Use of a sensor (load cell) or the like which directly detects a load is conceivable to make the relationship between the clutch pressure contact force and the stroke amount closer to a linear relationship. However, such configuration leads to problems of more complicated design (more complicated structure) and increase in cost.

The disclosed clutch device accurately controls the torque transmission capacity of a clutch by an electric actuator without causing complication in design and increase in cost.

A first aspect of the present invention is a clutch device which transmits torque by causing multiple friction engagement elements to engage with each other by use of a clutch connection/disconnection member caused to operate by an electric actuator, the clutch device including: an elastic member disposed between the clutch connection/disconnection member and the multiple friction engagement elements; position detection means for detecting a position of the clutch connection/disconnection member; and controlling means for controlling an operation of the electric actuator on the basis of the position of the clutch connection/disconnection member detected by the position detection means.

A second aspect of the present invention is a clutch device in which the clutch connection/disconnection member includes multiple members, and the position detection means detects a position of one of the multiple members, in addition to the configuration of the first aspect.

A third aspect of the present invention is a clutch device in which the one member is a cam member caused to operate by the electric actuator, and the controlling means calculates a stroke amount of the elastic member from a position of the cam member, in addition to the configuration of the second aspect.

A fourth aspect of the present invention is a clutch device in which the one member is a pressing member driven by a cam member caused to operate by the electric actuator, and the controlling means calculates a stroke amount of the elastic member from a position of the pressing member, in addition to the configuration of the second aspect.

A fifth aspect of the present invention is a clutch device in which the multiple friction engagement elements are engaged with each other by being biased by an engagement elastic member, and the multiple friction engagement elements are disengaged from each other when a value obtained by multiplying a spring constant of the elastic member by a stroke amount of the elastic member exceeds an elastic force of the engagement elastic member, in addition to the configuration of any one of the first to fourth aspects.

A sixth aspect of the present invention is a clutch device in which the cam member, the elastic member and the pressing member are arranged in an axial direction of the clutch device, in addition to the configuration of the fourth aspect.

A seventh aspect of the present invention is a clutch device in which the multiple friction engagement elements are disengaged from each other by being biased by a disengagement elastic member, and the multiple friction engagement elements are engaged with each other when a value obtained by multiplying a spring constant of the elastic member by a stroke amount of the elastic member exceeds an elastic force of the disengagement elastic member, in addition to the configuration of any one of the first to fourth aspects.

An eighth aspect of the present invention is a clutch device in which the clutch connection/disconnection member is a cam member, the clutch device includes a cam following member which is disposed between the cam member and the elastic member, and which transmits a driving force of the cam member to the elastic member, the cam member and the elastic member are disposed in such positions as to overlap each other in a radial direction of the clutch device, and the cam following member is disposed at an end portion of the clutch device in an axial direction thereof in a manner that a longitudinal direction of the cam following member is orthogonal to the axial direction, in addition to the configuration of the seventh aspect.

A ninth aspect of the present invention is a clutch device in which the clutch device includes a first clutch and a second clutch, and each of the first clutch and the second clutch includes the elastic member and the position detection means, in addition to the configuration of any one of the first to eighth aspects.

Note that, pressing members and cam members of embodiments correspond to the clutch connection/disconnection member. Push springs of the embodiments correspond to the elastic member. Engagement springs of the embodiments correspond to the engagement elastic member. An electronic control unit of the embodiments corresponds to the controlling means. A disengagement spring of the embodiment corresponds to the disengagement elastic member. A lever of the embodiment corresponds to the cam following member. Actuators of the embodiments correspond to the electric actuator. Clutches of the embodiments corresponds to the clutch device.

According to the configuration of the first aspect, the clutch device, which transmits torque by causing the multiple friction engagement elements to engage with each other by use of the clutch connection/disconnection member caused to operate by the electric actuator, includes: the elastic member disposed between the clutch connection/disconnection member and the multiple friction engagement element; the position detection means for detecting the position of the clutch connection/disconnection member; the controlling means for controlling the operation of the electric actuator on the basis of the position of the clutch connection/disconnection member detected by the position detection means. Thus, the position of the clutch connection/disconnection member (i.e. a stroke amount of the elastic member) and a torque transmission capacity of the clutch device have a linear relationship with each other. Hence, the torque transmission capacity of the clutch device can be accurately controlled by the electric actuator.

According to the configuration of the second aspect, the clutch connection/disconnection member includes the multiple members, and the position detection means detects the position of the one of the multiple members. Thus, freedom in an installation position of the position detection means can be increased.

According to the configuration of the third aspect, the position detection means detects the position of the cam member caused to operate by the electric actuator, and the controlling means calculates the stroke amount of the elastic member from the position of the cam member. Thus, the clutch capacity can be accurately controlled by using general position detection means such as a rotary encoder.

According to the configuration of the fourth aspect, the position detection means detects the position of the pressing member driven by the cam member caused to operate by the electric actuator, and the controlling means calculates the stroke amount of the elastic member from the position of the pressing member. Thus, the clutch capacity can be accurately controlled by using general position detection means such as a linear encoder.

According to the configuration of the fifth aspect, the multiple friction engagement elements are engaged with each other by being biased by the engagement elastic member, and the multiple friction engagement elements are disengaged from each other when the value obtained by multiplying the spring constant of the elastic member by the stroke amount of the elastic member exceeds the elastic force of the engagement elastic member. Thus, the clutch capacity of a so-called normally-closed clutch can be accurately controlled.

According to the configuration of the sixth aspect, the cam member, the elastic member and the pressing member are arranged in the axial direction of the clutch device. Thus, the dimension of the clutch device can be made smaller in a radial direction.

According to the configuration of the seventh aspect, the multiple friction engagement elements are disengaged from each other by being biased by the disengagement elastic member, and the multiple friction engagement elements are engaged with each other when the value obtained by multiplying the spring constant of the elastic member by the stroke amount of the elastic member exceeds the elastic force of the disengagement elastic member. Thus, the clutch capacity of a so-called normally-open clutch can be accurately controlled.

According to the configuration of the eighth aspect, the clutch device includes the cam following member which is disposed between the cam member being the clutch connection/disconnection member and the elastic member, and which transmits the driving force of the cam member to the elastic member, the cam member and the elastic member are disposed in such positions as to overlap each other in the radial direction of the clutch device, and the cam following member is disposed at the end portion of the clutch device in the axial direction thereof such that the longitudinal direction of the cam following member is orthogonal to the axial direction. Thus, the cam member can be disposed in an open space on the outer side of the elastic member in the radial direction without causing increase in dimension of the clutch device in the axial direction.

According to the configuration of the ninth aspect, the clutch device includes the first clutch and the second clutch, and each of the first clutch and the second clutch includes the elastic member and the position detection means. Thus, the capacity of the so-called twin-clutch device can be accurately controlled.

BRIEF DESCRIPTION OF THE DRAWINGS

The advantages of the invention will become apparent in the following description taken in conjunction with the drawings, wherein.

DETAILED DESCRIPTION OF THE INVENTION

A first embodiment of the present invention is described below based on FIGS. 1 to 4.

Figure 1:
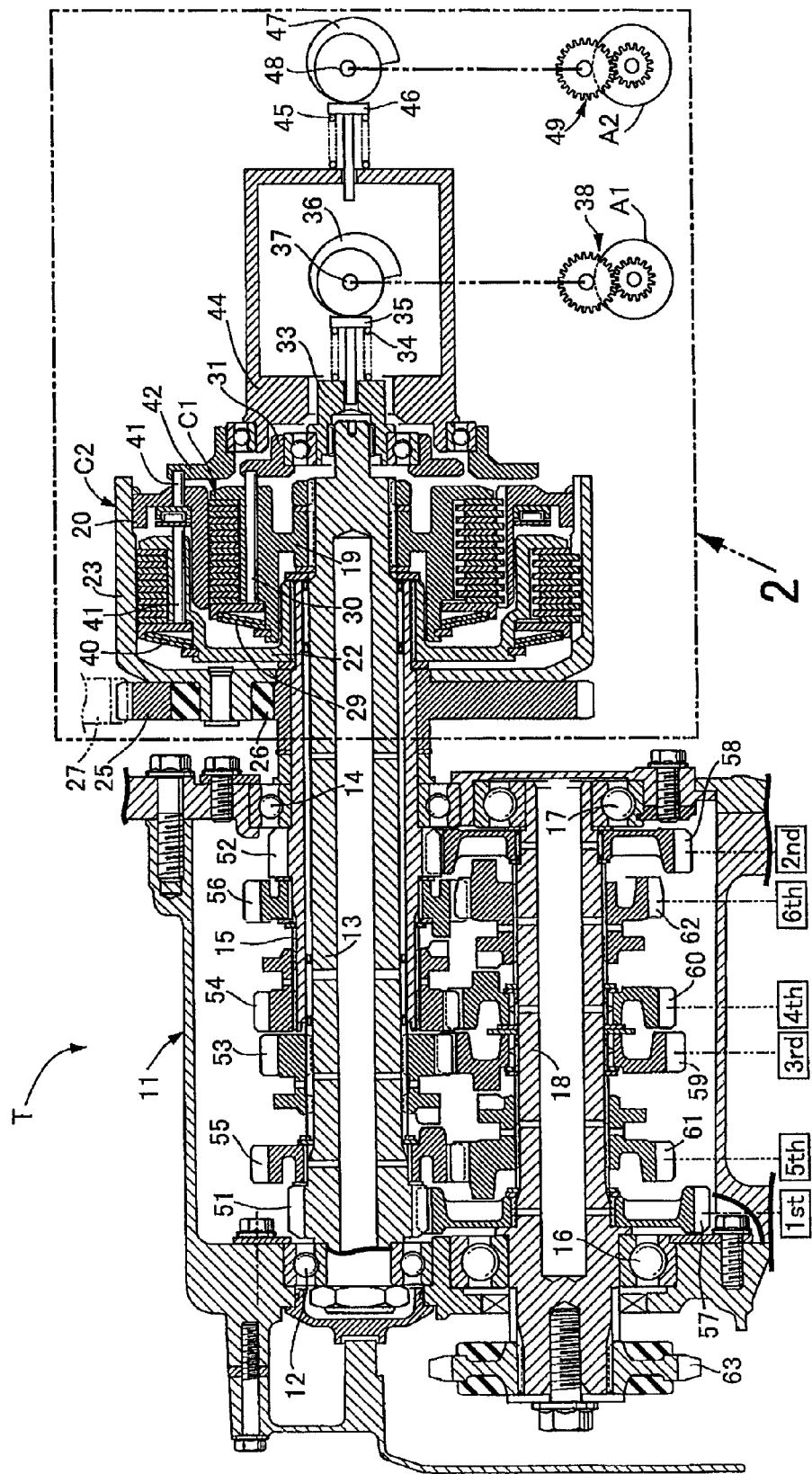
FIG. 1 is a vertical cross-sectional view of a twin-clutch automatic transmission of the first embodiment.
Figure 2:
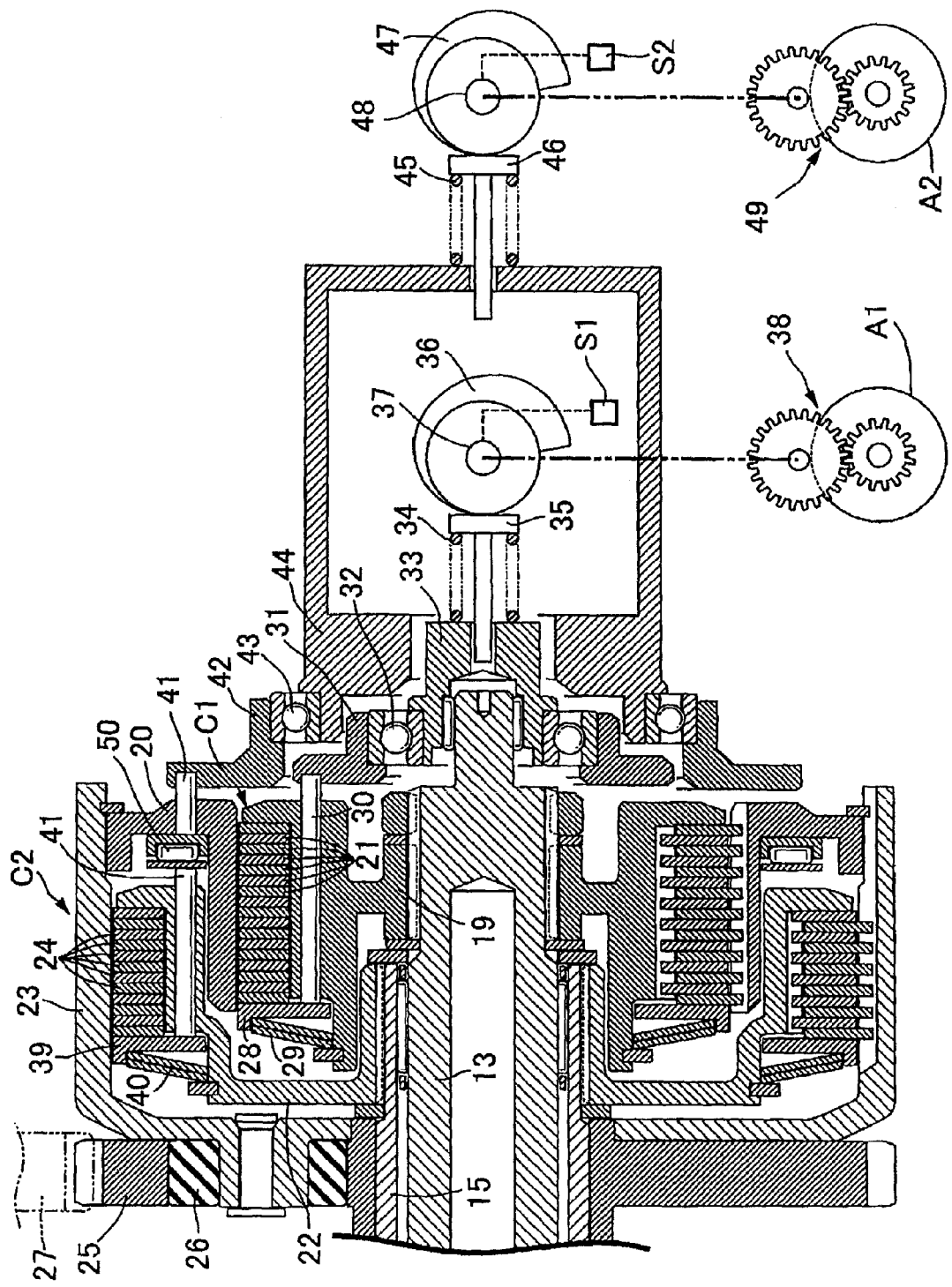
FIG. 2 is an enlarged view of a portion 2 in FIG. 1.

As shown in FIGS. 1 and 2, an automatic transmission T of a so-called twin-clutch type, which is preferably applied to a motorcycle, is one which outputs a driving force of a crankshaft of an engine to a drive wheel while changing the speed. The automatic transmission T includes: an inner main shaft 13 supported by a transmission case 11 via a ball bearing 12; an outer main shaft 15 fitted coaxially on an outer circumference of the inner main shaft 13, and supported by the transmission case 11 via a ball bearing 14; and a counter shaft 18 supported by the transmission case 11 via a pair of ball bearings 16, 17.

A first clutch C1 to be engaged when any of odd numbered speeds (first speed, third speed, fifth speed) is established is disposed at a shaft end of the inner main shaft 13. A second clutch C2 to be engaged when any of even numbered speeds (second speed, fourth speed, sixth speed) is established is disposed at a shaft end of the outer main shaft 15. Of the first and second clutches C1, C2, the second clutch C2 is disposed radially outward of the first clutch C1 in such a manner as to surround the outer side of the first clutch C1.

The first clutch C1 includes: a clutch inner member 19 fixed to the inner main shaft 13; a clutch outer member 20 disposed coaxially to an outer circumference of the clutch inner member 19; and multiple friction engagement elements 21 . . . disposed between the clutch inner member 19 and the clutch outer member 20. The second clutch C2 includes: a clutch inner member 22 fixed to the outer main shaft 15; a clutch outer member 23 disposed coaxially to an outer circumference of the clutch inner member 22; and multiple friction engagement elements 24 . . . disposed between the clutch inner member 22 and the clutch outer member 23.

A driven gear 25 is relatively rotatably supported on an outer circumference of the outer main shaft 15. The clutch outer members 20, 23 of the first and second clutches C1, C2 are fixed to the driven gear 25 via a damper 26. A drive gear 27 provided on the crankshaft of the engine (not shown) meshes with the driven gear 25. Thus, the driving force of the crankshaft of the engine is transmitted to the clutch outer members 20, 23 of the first and second clutches C1, C2 via the drive gear 27, the driven gear 25, and the damper 26.

The first clutch C1 includes: a pressure plate 28 brought into contact with the left end of the friction engagement elements 21 . . . in the drawings; an engagement spring 29 biasing the pressure plate 28 toward the friction engagement elements 21 . . . , i.e. to the right in the drawings; a push rod 30 penetrating the inside of the clutch inner member 19 in an axial direction; a pressing member 31 brought into contact with the right end of the push rod 30 in the drawings; a transmission member 33 connected to the pressing member 31 via a ball bearing 32; a push spring 34 having its left end in the drawings brought into contact with the transmission member 33; a cam follower 35 brought into contact with the right end of the push spring 34 in the drawings; a spiral-shaped cam member 36 brought into contact with the cam follower 35; and a first actuator A1 formed of an electric motor connected to a rotation shaft 37 of the cam member 36 via a gear train 38.

The first clutch C1 is a normally-closed clutch which is in engagement by the elastic force of the engagement spring 29 when the first actuator A1 is not operating. When the first actuator A1 operates and rotates the cam member 36 via the gear train 38 and the rotation shaft 37, the movement of the cam follower 35 is transmitted to the pressure plate 28 via the push spring 34, the transmission member 33, the ball bearing 32, the pressing member 31, and the push rod 30. The pressure plate 28 thereby compresses the engagement spring 29 and moves to the left in the drawing. Thus, the first clutch C1 is disengaged.

The second clutch C2 includes: a pressure plate 39 brought into contact with the left end of the friction engagement elements 24 . . . in the drawings; an engagement spring 40 biasing the pressure plate 39 toward the friction engagement elements 24 . . . , i.e. to the right in the drawings; a push rod 41 penetrating the insides of the clutch inner member 22 and the clutch outer member 20 in the axial direction; a pressing member 42 brought into contact with the right end of the push rod 41 in the drawings; a transmission member 44 connected to the pressing member 42 via a ball bearing 43; a push spring 45 having its left end in the drawings brought into contact with the transmission member 44; a cam follower 46 brought into contact with the right end of the push spring 45 in the drawings; a spiral-shaped cam member 47 brought into contact with the cam follower 46; and a second actuator A2 formed of an electric motor connected to a rotation shaft 48 of the cam member 47 via a gear train 49. Note that the push rod 41 is divided into two parts with a thrust bearing 50 in between to allow the clutch inner member 22 and the clutch outer member 20 to rotate relative to each other.

The first clutch C2 is a normally-closed clutch which is in engagement by the elastic force of the engagement spring 40 when the second actuator A2 is not operating. When the second actuator A2 operates and rotates the cam member 47 via the gear train 49 and the rotation shaft 48, the movement of the cam follower 46 is transmitted to the pressure plate 39 via the second push spring 45, the transmission member 44, the ball bearing 43, the pressing member 42, and the push rod 41. The pressure plate 39 thereby compresses the engagement spring 40 and moves to the left in the drawing. Thus, the second clutch C2 is disengaged.

The inner main shaft 13 supports a first drive gear 51, a third drive gear 53, and a fifth drive gear 55. The outer main shaft 15 supports a second drive gear 52, a fourth drive gear 54, and a sixth drive gear 56. The counter shaft 18 supports a first driven gear 57 meshing with the first drive gear 51, a second driven gear 58 meshing with the second drive gear 52, a third driven gear 59 meshing with the third drive gear 53, a fourth driven gear 60 meshing with the fourth drive gear 54, a fifth driven gear 61 meshing with the fifth drive gear 55, and a sixth driven gear 62 meshing with the sixth drive gear 56.

Accordingly, the first speed, the third speed, and the fifth speed can be selectively established by connecting the inner main shaft 13 and the counter shaft 18 with each other by pairs of the first gears, the third gears, and the fifth gears, respectively. The second speed, the fourth speed, and the sixth speed can be selectively established by connecting the outer main shaft 15 and the counter shaft 18 with each other by pairs of the second gears, the fourth gears, and the sixth gears, respectively.

A drive sprocket 63 is provided at the left end of the counter shaft 18 in the drawing, and is connected to the drive wheel via a chain and a driven sprocket, which are not illustrated.

Next, an operation of an embodiment of the present invention with the above configuration is described.

When the first clutch C1 is engaged by the first actuator A1 and the second clutch C2 is disengaged by the second actuator A2 in a state where the inner main shaft 13 and the counter shaft 18 are connected by the first drive gear 51 and the first driven gear 57, the driving force of the engine is transmitted to the drive wheel through a route of the drive gear 27, the driven gear 25, the first clutch C1, the inner main shaft 13, the first drive gear 51, the first driven gear 57, the counter shaft 18, the drive sprocket 63, the chain, and the driven sprocket. Thus, the first speed is established.

When the second clutch C2 is engaged by the second actuator A2 and the first clutch C1 is disengaged by the first actuator A1 in a state where the outer main shaft 15 and the counter shaft 18 are connected by the second drive gear 52 and the second driven gear 58, the driving force of the engine is transmitted to the drive wheel through a route of the drive gear 27, the driven gear 25, the second clutch C2, the outer main shaft 15, the second drive gear 52, the second driven gear 58, the counter shaft 18, the drive sprocket 63, the chain, and the driven sprocket. Thus, the second speed is established.

When the first clutch C1 is engaged by the first actuator A1 and the second clutch C2 is disengaged by the second actuator A2 in a state where the inner main shaft 13 and the counter shaft 18 are connected by the third drive gear 53 and the third driven gear 59, the driving force of the engine is transmitted to the drive wheel through a route of the drive gear 27, the driven gear 25, the first clutch C1, the inner main shaft 13, the third drive gear 53, the third driven gear 59, the counter shaft 18, the drive sprocket 63, the chain, and the driven sprocket. Thus, the third speed is established.

When the second clutch C2 is engaged by the second actuator A2 and the first clutch C1 is disengaged by the first actuator A1 in a state where the outer main shaft 15 and the counter shaft 18 are connected by the fourth drive gear 54 and the fourth driven gear 60, the driving force of the engine is transmitted to the drive wheel through a route of the drive gear 27, the driven gear 25, the second clutch C2, the outer main shaft 15, the fourth drive gear 54, the fourth driven gear 60, the counter shaft 18, the drive sprocket 63, the chain, and the driven sprocket. Thus, the fourth speed is established.

When the first clutch C1 is engaged by the first actuator A1 and the second clutch C2 is disengaged by the second actuator A2 in a state where the inner main shaft 13 and the counter shaft 18 are connected by the fifth drive gear 55 and the fifth driven gear 61, the driving force of the engine is transmitted to the drive wheel through a route of the drive gear 27, the driven gear 25, the first clutch C1, the inner main shaft 13, the fifth drive gear 55, the fifth driven gear 61, the counter shaft 18, the drive sprocket 63, the chain, and the driven sprocket. Thus, the fifth speed is established.

When the second clutch C2 is engaged by the second actuator A2 and the first clutch C1 is disengaged by the first actuator A1 in a state where the outer main shaft 15 and the counter shaft 18 are connected by the sixth drive gear 56 and the sixth driven gear 62, the driving force of the engine is transmitted to the drive wheel through a route of the drive gear 27, the driven gear 25, the second clutch C2, the outer main shaft 15, the sixth drive gear 56, the sixth driven gear 62, the counter shaft 18, the drive sprocket 63, the chain, and the driven sprocket. Thus, the sixth speed is established.

While driving in a state where the odd numbered speed (first speed, third speed, or fifth speed) is established and the first clutch C1 is in engagement, pre-shifting to the even numbered speed (second speed, fourth speed, or sixth speed) is performed in advance. Then, when the first clutch is disengaged and the second clutch is engaged, a gear change can be performed without causing interruption of the driving force. Similarly, while driving in a state where the even numbered speed is established and the second clutch C2 is in engagement, pre-shifting to the odd numbered speed is performed in advance. Then, when the second clutch is disengaged and the first clutch is engaged, a gear change can be performed without causing interruption of the driving force.

Figure 3:
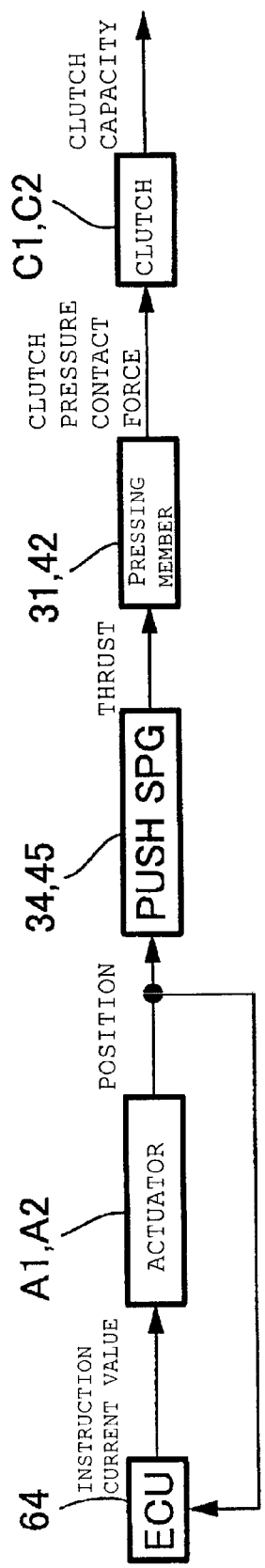
FIG. 3 is a block diagram of a control system of a clutch of the first embodiment.

FIG. 3 is a block diagram of a control system for a clutch capacity of the first or second clutch C1, C2 of this embodiment. When the value of a current to be supplied to the first or second actuator A1, A2 is controlled based on an instruction current value from an electronic control unit 64, the first or second actuator A1, A2 moves to a predetermined position while compressing the push spring 34, 45, and thereby drives the pressing member 31, 42. The position (rotation angle) of the first or second actuator A1, A2 at this time is detected by a first or second position detection means S1, S2 (see FIG. 2) such as a potentiometer.

Figure 4A:
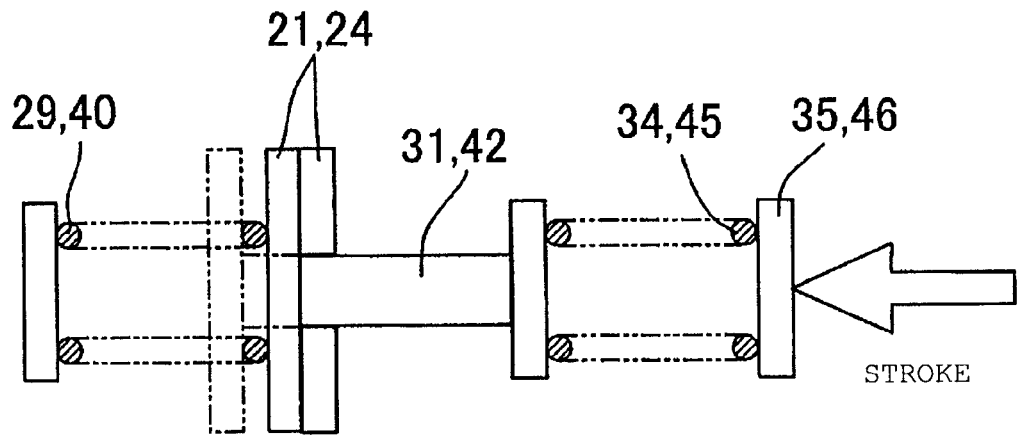
FIGS. 4(A) and 4(B) are diagrams for explaining capacity control of the clutch of the first embodiment.

As schematically shown in FIG. 4(A), when the first or second actuator A1, A2 operates, the push spring 34, 45 is compressed, and the pressing member 31, 42 is driven by a thrust corresponding to the compression amount. Thus, a clutch pressure contact force is applied from the pressing member 31, 42 to the friction engagement elements 21 . . . , 24 . . . of the first or second clutch C1, C2, against the elastic force of the engagement spring 29, 40. The first or second clutch C1, C2 engages by a clutch capacity corresponding to this clutch pressure contact force. The first or second clutch C1, C2 of this embodiment is a normally-closed clutch. Thus, the clutch pressure contact force takes a negative value, that is, the clutch pressure contact force is applied in a disengagement direction.

Figure 4B:
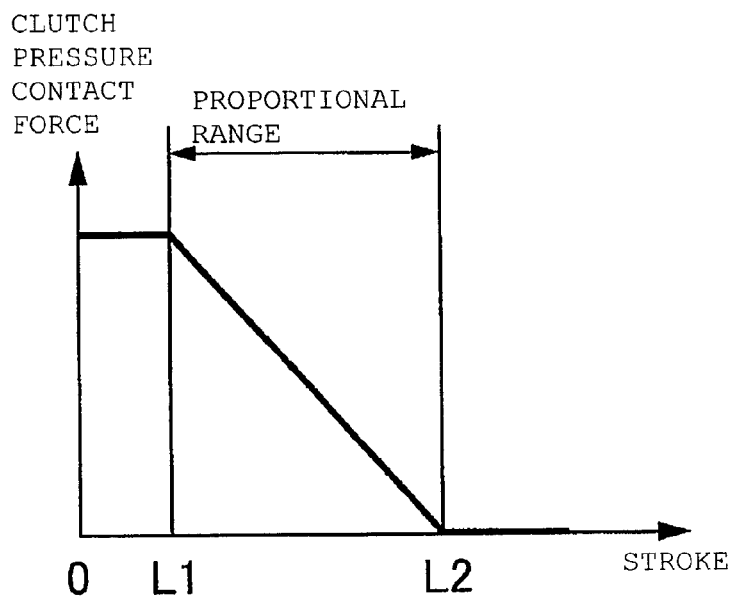

FIG. 4(B) is a graph showing a relationship between a stroke of the pressing member 31, 42 (i.e. the position of the first or second actuator A1, A2) and the clutch pressure contact force. When the push spring 34, 45 is compressed, the stroke of the pressing member 31, 42 gradually increases from zero and reaches L1 (clutch touch point). When the stroke reaches L1, the engagement spring 29, 40 starts to be compressed, and the clutch pressure contact force gradually decreases. The clutch pressure contact force is zero after the stroke reaches L2, and the first or second clutch C1, C2 is completely disengaged.

At this time, assuming that a set load (preload) of the push spring 34, 45 is zero, the following relationship is established among the clutch pressure contact force, the work load of the engagement spring 29, 40, the spring constant of the push spring 34, 45, and the stroke of the push spring 34, 45 (i.e. the position of the first or second actuator A1, A2):

> clutch pressure contact force=work load of engagement spring−(spring constant of push spring× stroke).

Accordingly, the clutch pressure contact force can be linearly changed in accordance with the stroke of the push spring 34, 45.

As a result, an abrupt change in the clutch pressure contact force which is caused merely by slight drive of the first or second actuator A1, A2 is prevented, and the clutch pressure contact force can be finely and accurately controlled by providing a feedback of the position of the first or second actuator A1, A2.

As described above, according to this embodiment, the push spring 34, 45 is disposed between the cam follower 35, 46 and the transmission member 33, 44. Accordingly, a linear relationship is established between the position of the cam member 36, 47 (i.e. the stroke amount of the push spring 34, 45) and a torque transmission capacity of the first or second clutch C1, C2. Thus, the torque transmission capacity of the first or second clutch C1, C2 can be accurately controlled with the first or second actuator A1, A2.

Moreover, the cam member 36, 47, the cam follower 35, 46, the push spring 34, 45, the pressing member 31, 42, and the multiple friction engagement elements 21 . . . , 24 . . . are arranged in the axial direction of the first or second clutch C1, C2. Thus, the first or second clutch C1, C2 can have smaller dimension in the radial direction thereof.

A second embodiment of the present invention is described next based on FIGS. 5 and 6.

While the first and second clutches C1, C2 of the first embodiment are normally-closed clutches, a clutch C of the second embodiment is a normally-open clutch.

Figure 5:
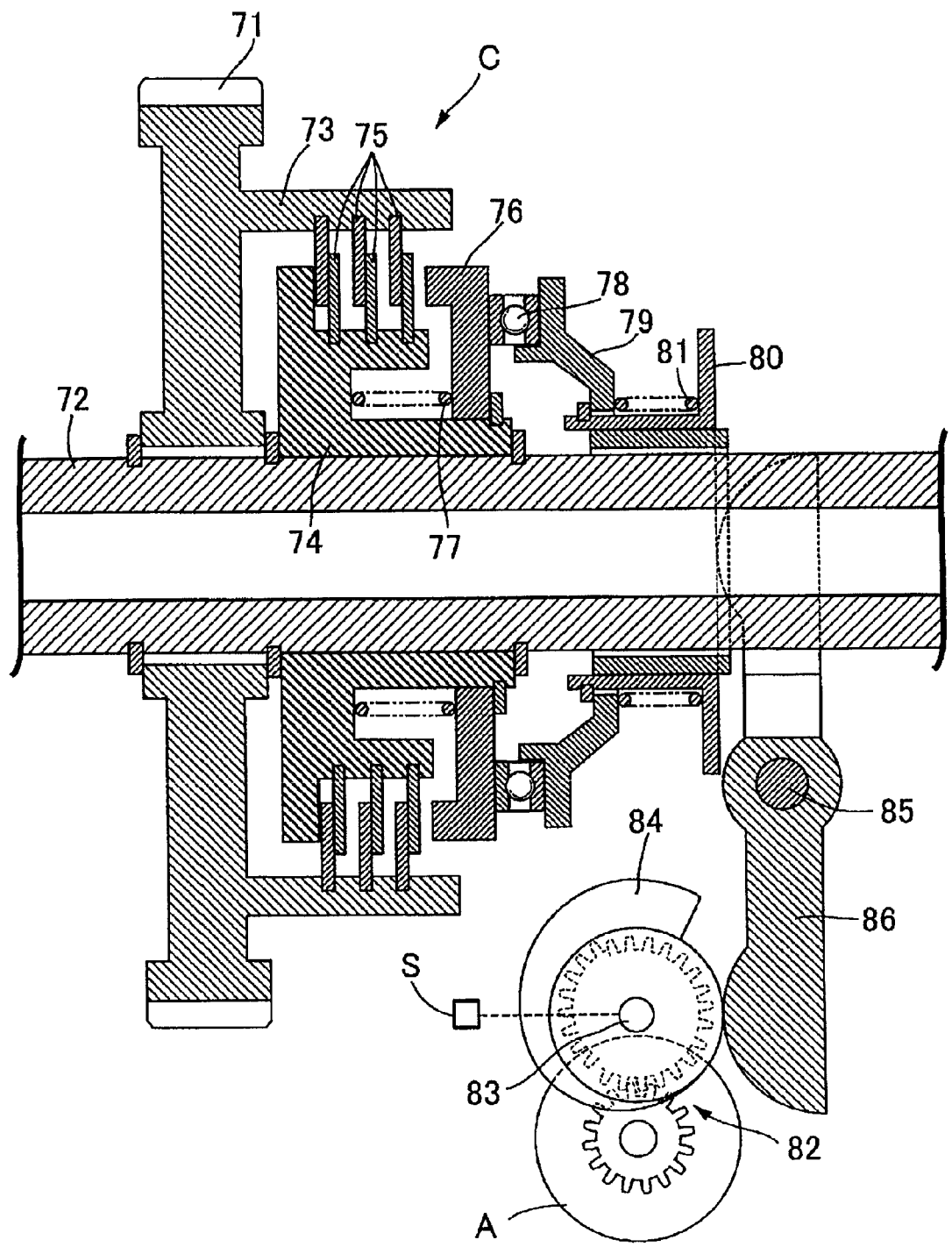
FIG. 5 is a vertical cross-sectional view of a normally-open clutch of a second embodiment.

As shown in FIG. 5, the clutch C transmits the rotation of an input gear 71 to an output shaft 72 located therein. Multiple friction engagement elements 75 . . . are disposed between a clutch outer member 73 provided integrally with the input gear 71 and an clutch inner member 74 fixedly provided to the output shaft 72. A pressing member 76 is supported by an outer circumference of the clutch inner member 74 in a manner slidable in an axial direction. A disengagement spring 77 biasing the clutch inner member 74 in a disengagement direction (direction in which the friction engagement elements 75 . . . are moved away from each other) is disposed between the clutch inner member 74 and the pressing member 76. A cam follower 80 is supported in a manner slidable in the axial direction by an intermediate member 79 which is connected to the pressing member 76 via a ball bearing 78 and which is supported in a manner slidable in the axial direction by an outer circumference of the output shaft 72. A push spring 81 is disposed between the intermediate member 79 and the cam follower 80. A cam member 84 is connected to an actuator A formed of an electric motor via a gear train 82 and a rotation shaft 83, and is brought into contact with one end of a lever 86 which is pivotally supported at its center portion by a casing via a supporting shaft 85. The other end of the lever 86 is brought into contact with the cam follower 80.

In the above configuration, the clutch C is disengaged when the actuator A is not operating, since the clutch inner member 74 is biased in the disengagement direction by the disengagement spring 77. When the actuator A is made to drive in this state, the driving force thereof is transmitted to the gear train 82, the rotation shaft 83, the cam member 84, the lever 86, the cam follower 80, the push spring 81, the intermediate member 79, the ball bearing 78, and the pressing member 76. Then, the pressing member 76 compresses the disengagement spring 77 and brings the friction engagement elements 75 . . . into contact with each other. Thus, the clutch outer member 73 and the clutch inner member 74 are connected, and the clutch C is engaged. Note that, as similar to the first embodiment, the position of the cam member 84 is detected by position detection means S (position detector), and an electronic control unit (controller) 64 controls the operation of the actuator A based on the detected position.

Figure 6A:
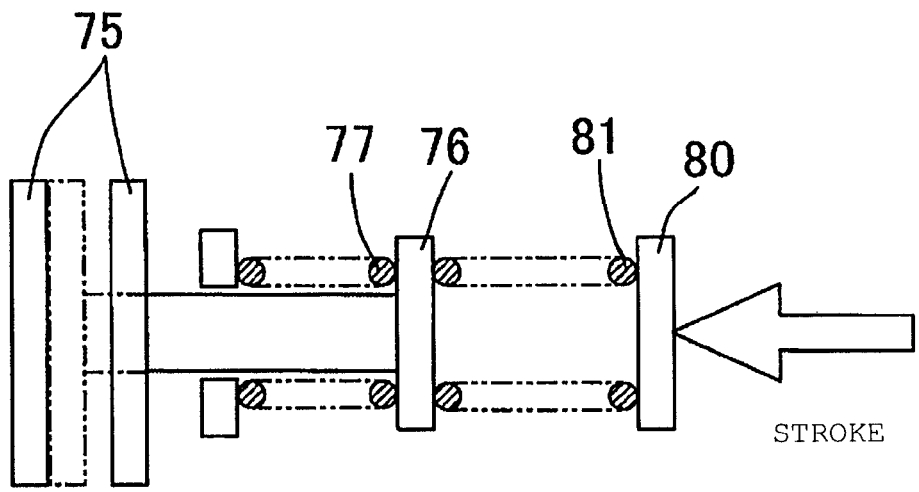
FIGS. 6(A) and 6 (B) are diagrams for explaining capacity control of the clutch of the second embodiment.

As schematically shown in FIG. 6(A), the push spring 81 is compressed by the cam follower 80 when the actuator A operates. When the elastic force of the push spring 81 exceeds the elastic force of the disengagement spring 77, the pressing member 76 is driven by a thrust corresponding to the compression amount of the push spring 81. Thus, a clutch pressure contact force is applied from the pressing member 76 to the friction engagement elements 75 of the clutch C, and the clutch C is engaged at a clutch capacity corresponding to the clutch pressure contact force. The clutch C of this embodiment is a normally-open clutch. Thus, the clutch pressure contact force takes a positive value, that is, the clutch pressure contact force is applied in an engagement direction.

Figure 6B:
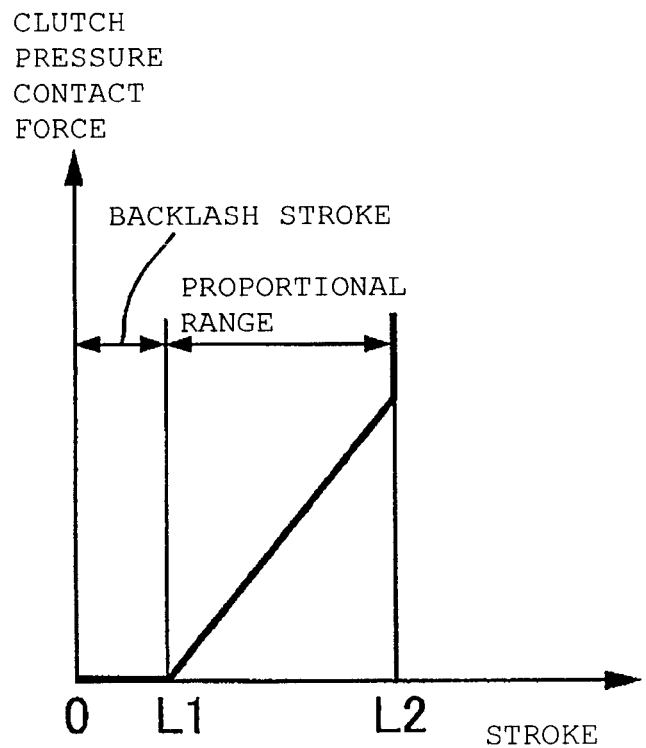
Figure 7:
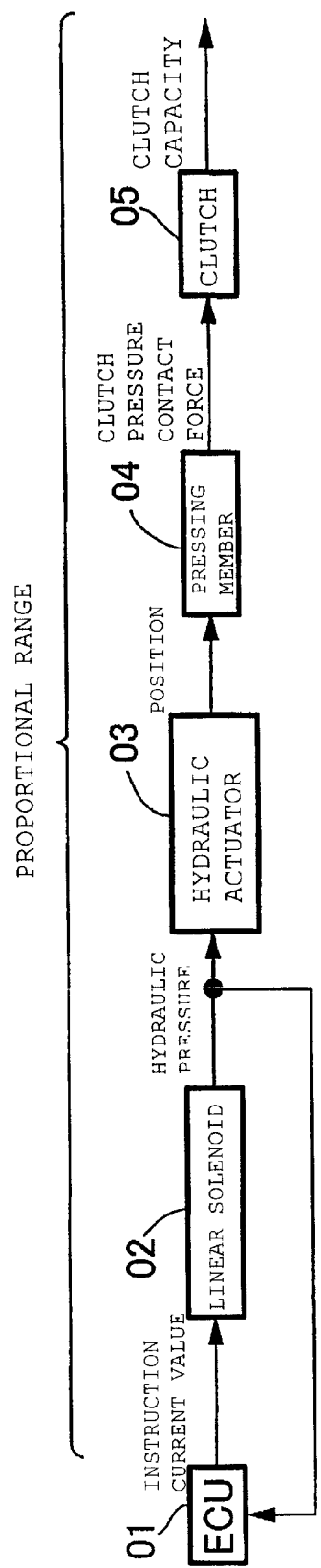
FIG. 7 is a diagram for explaining capacity control of a hydraulic clutch of a convention example.
Figure 8:
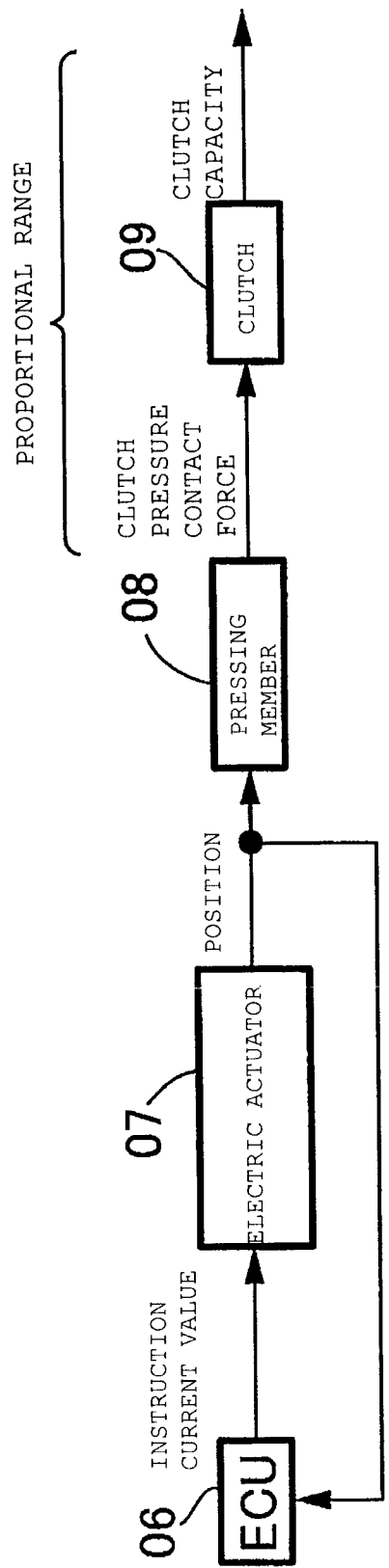
FIG. 8 is a diagram for explaining capacity control of an electric clutch of the conventional example.
Figure 9A:
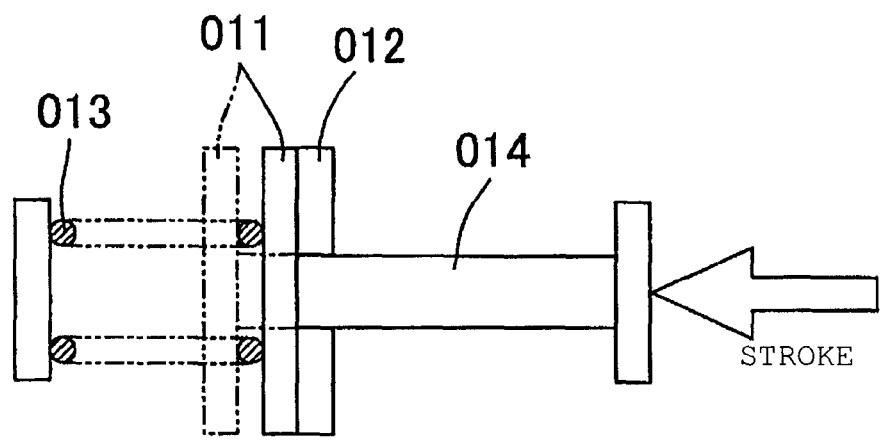
FIGS. 9(A) and 9(B) are diagrams for explaining an electric normally-closed clutch of the conventional example.
Figure 9B:
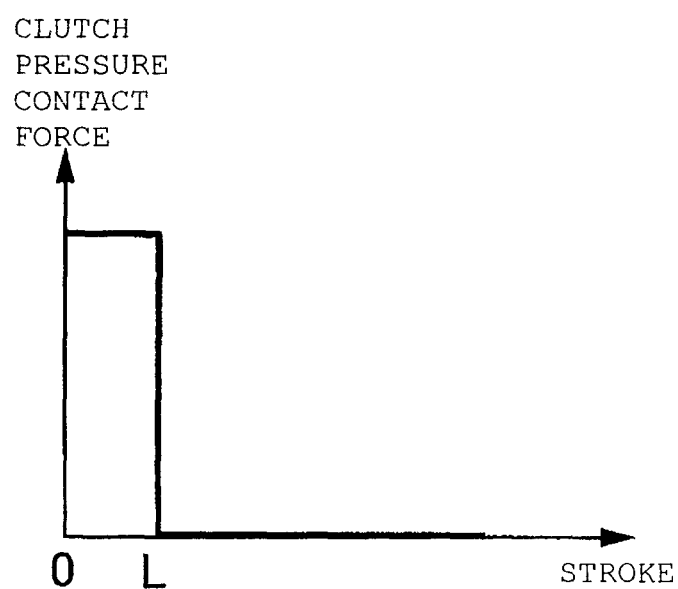
Figure 10A:
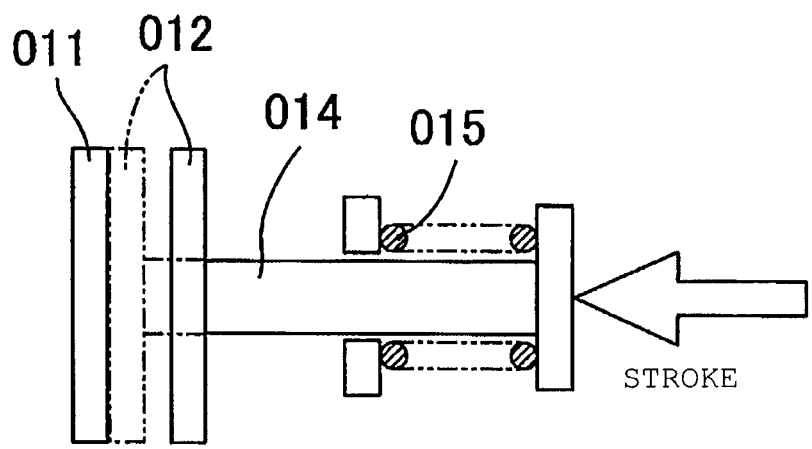
FIGS. 10(A) and 10(B) are diagrams for explaining an electric normally-open clutch of the conventional example.
Figure 10B:
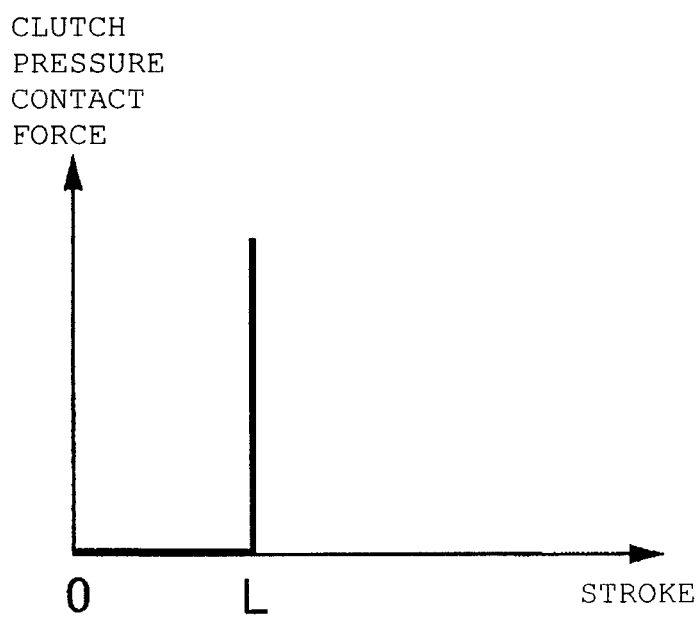

FIG. 6(B) is a graph showing a relationship between a stroke of the pressing member 76 (i.e. the position of the actuator A) and the clutch pressure contact force. When the push spring 81 is compressed, the stroke of the pressing member 76 gradually increases from zero and reaches L1 (clutch touch point). When the stroke reaches L1, the disengagement spring 77 starts to be compressed, and the clutch pressure contact force gradually increases. After the stroke reaches L2, the friction engagement elements 75 . . . are completely in tight contact with each other, and the clutch pressure contact force rises abruptly. Thus, the clutch C is completely engaged.

At this time, assuming that a set load (preload) of the push spring 81 is zero, the following relationship is established among the clutch pressure contact force, the spring constant of the push spring 81, the stroke of the push spring 81 (i.e. the position of the actuator A), and a backlash stroke (stroke required to reach the clutch touch point: constant) of the push spring 81:

> clutch pressure contact force=spring constant of push spring×(stroke−backlash stroke).

Accordingly, the clutch pressure contact force can be linearly changed in accordance with the stroke of the push spring 81.

As a result, an abrupt change in the clutch pressure contact force which is caused merely by slight drive of the actuator A is prevented, and the clutch pressure contact force can be finely and accurately controlled by providing a feedback of the position of the actuator A.

Moreover, the cam member 84 and the push spring 81 are disposed at such positions as to overlap each other in a radial direction of the clutch C. In addition, the lever 86 is disposed at an end portion of the clutch C in the axial direction in a manner that the longitudinal direction of the lever 86 is orthogonal to the axial direction. Accordingly, the dimension of the clutch C is not increased in the axial direction, and the cam member 84 is disposed in an open space on the outer side of the push spring 81 in the radial direction.

The embodiments of the present invention have been described above. However, various design changes can be made in the present invention without departing from the gist of the present invention.

For example, the clutch device of the present invention can be applied to any application other than the automatic transmission T.

Moreover, the clutch connection/disconnection member of the present invention is not limited to the cam member 36, 47, 84 of the embodiments described above, and may be any member (for example, pressing member 31, 42, 76) which is disposed between the actuator A1, A2, A and the friction engagement elements 21 . . . , 24 . . . , 75 . . . and which transmits the driving force of the actuator A1, A2, A to the friction engagement elements 21 . . . , 24 . . . , 75 . . . . Note that, the clutch connection/disconnection member has to be located at a position closer to the actuator A1, A2, A than the push spring 34, 45, 81.

Moreover, in the embodiments, the clutch connection/disconnection member is the cam member 36, 47, 84 which rotates, and its position is detected by the rotary encoder. In a case where the clutch connection/disconnection member is a member which reciprocates such as the pressing member 31, 42, 76, a position sensor such as a linear encoder can be employed as the position detection means S1, S2, S. In both cases, the position of the clutch connection/disconnection member can be accurately detected while using general and inexpensive position detection means.

Moreover, when the clutch connection/disconnection member is formed of multiple members such as a gear train, a cam member, a cam follower, an intermediate member, and a pressing member, the position detection means is required to be provided only to any one of the members. Thus, the installation space for the position detection means can be easily secured, and freedom in design can be increased.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A clutch device, comprising:
a cam member actuated by an electric actuator,
an elastic member actuated by said cam member,
a clutch connection/disconnection member actuated by said elastic member,
an engagement or disengagement elastic member actuated by said clutch connection/disconnection member,
a plurality of friction engagement elements actuated by said engagement or disengagement elastic member;
a position detector which detects a position of said cam member; and
a controller which controls operation of the electric actuator on the basis of the position of said cam member detected by said position detector,
wherein said clutch device transmits torque by causing said plurality of friction engagement elements to engage with each other by use of said cam member operated by said electric actuator.

2. The clutch device according to claim 1,
wherein said cam member includes a plurality of cam members, and
wherein said position detector detects a position of one of said plurality of cam members.

3. The clutch device according to claim 2,
wherein said controller calculates a stroke amount of said elastic member based on a position of said cam member.

4. The clutch device according to claim 3,
wherein said engagement or disengagement member is an engagement elastic member,
wherein said plurality of friction engagement elements are engaged with each other due to biasing by said engagement elastic member, and
wherein said plurality of friction engagement elements are disengaged from each other when a value obtained by multiplying a spring constant of said elastic member by a stroke amount of said elastic member exceeds an elastic force of said engagement elastic member.

5. The clutch device according to claim 3,
wherein said engagement or disengagement member is a disengagement elastic member,
wherein said plurality of friction engagement elements are disengaged from each other due to biasing by said disengagement elastic member, and
wherein said plurality of friction engagement elements are engaged with each other when a value obtained by multiplying a spring constant of said elastic member by a stroke amount of said elastic member exceeds an elastic force of said disengagement elastic member.

6. The clutch device according to claim 5,
wherein said clutch device further comprises a cam following member disposed between said cam member and said elastic member, said cam following member transmitting a driving force of said cam member to said elastic member,
wherein said cam member and said elastic member overlap each other in a radial direction of said clutch device, and
wherein said cam following member is disposed at an end portion of said clutch device in an axial direction thereof, such that a longitudinal direction of said cam following member is orthogonal to the axial direction of said clutch device.

7. The clutch device according to claim 3,
wherein said clutch device includes a first clutch and a second clutch, and
wherein said first clutch includes said elastic member and said position detector and said second clutch includes another elastic member and another position detector.

8. The clutch device according to claim 2,
wherein said engagement or disengagement member is an engagement elastic member,
wherein said plurality of friction engagement elements are engaged with each other due to biasing by said engagement elastic member, and
wherein said plurality of friction engagement elements are disengaged from each other when a value obtained by multiplying a spring constant of said elastic member by a stroke amount of said elastic member exceeds an elastic force of said engagement elastic member.

9. The clutch device according to claim 2,
wherein said engagement or disengagement member is a disengagement elastic member,
wherein said plurality of friction engagement elements are disengaged from each other due to biasing by said disengagement elastic member, and
wherein said plurality of friction engagement elements are engaged with each other when a value obtained by multiplying a spring constant of said elastic member by a stroke amount of said elastic member exceeds an elastic force of said disengagement elastic member.

10. The clutch device according to claim 9,
wherein said clutch device further comprises a cam following member disposed between said cam member and said elastic member, said cam following member transmitting a driving force of said cam member to said elastic member,
wherein said cam member and said elastic member overlap each other in a radial direction of said clutch device, and
wherein said cam following member is disposed at an end portion of said clutch device in an axial direction thereof, such that a longitudinal direction of said cam following member is orthogonal to the axial direction of said clutch device.

11. The clutch device according to claim 2,
wherein said clutch device includes a first clutch and a second clutch, and
wherein said first clutch includes said elastic member and said position detector and said second clutch includes another elastic member and another position detector.

12. The clutch device according to claim 1,
wherein said engagement or disengagement member is an engagement elastic member,
wherein said plurality of friction engagement elements are engaged with each other due to biasing by said engagement elastic member, and
wherein said plurality of friction engagement elements are disengaged from each other when a value obtained by multiplying a spring constant of said elastic member by a stroke amount of said elastic member exceeds an elastic force of said engagement elastic member.

13. The clutch device according to claim 1, wherein said cam member, said elastic member and said clutch connection/disconnection member are disposed coaxially with said clutch device.

14. The clutch device according to claim 1,
wherein said engagement or disengagement member is a disengagement elastic member,
wherein said plurality of friction engagement elements are disengaged from each other due to biasing by said disengagement elastic member, and
wherein said plurality of friction engagement elements are engaged with each other when a value obtained by multiplying a spring constant of said elastic member by a stroke amount of said elastic member exceeds an elastic force of said disengagement elastic member.

15. The clutch device according to claim 14,
wherein said clutch device further comprises a cam following member disposed between said cam member and said elastic member, said cam following member transmitting a driving force of said cam member to said elastic member,
wherein said cam member and said elastic member overlap each other in a radial direction of said clutch device, and
wherein said cam following member is disposed at an end portion of said clutch device in an axial direction thereof, such that a longitudinal direction of said cam following member is orthogonal to the axial direction of said clutch device.

16. The clutch device according to claim 1,
wherein said clutch device includes a first clutch and a second clutch, and
wherein said first clutch includes said elastic member and said position detector and said second clutch includes another elastic member and another position detector.

* * * * *